(12) United States Patent
Pohl

(10) Patent No.: US 8,104,721 B2
(45) Date of Patent: Jan. 31, 2012

(54) AIRFOIL FOR AN AIRCRAFT AND AIRCRAFT

(75) Inventor: Ulrich Pohl, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 595 days.

(21) Appl. No.: 12/085,786

(22) PCT Filed: Dec. 29, 2006

(86) PCT No.: PCT/EP2006/070273
§ 371 (c)(1),
(2), (4) Date: Apr. 15, 2009

(87) PCT Pub. No.: WO2007/074173
PCT Pub. Date: Jul. 5, 2007

(65) Prior Publication Data
US 2010/0059633 A1    Mar. 11, 2010

(30) Foreign Application Priority Data

Dec. 29, 2005 (DE) .......................... 10 2005 062 919

(51) Int. Cl.
*B64C 3/50* (2006.01)
(52) U.S. Cl. ....................................... 244/215; 244/213
(58) Field of Classification Search ................... 244/215, 244/213, 217, 201, 204, 198, 216
See application file for complete search history.

(56) References Cited

U.S. PATENT DOCUMENTS

| 3,874,617 | A |   | 4/1975  | Johnson            |         |
|-----------|---|---|---------|--------------------|---------|
| 4,434,959 | A | * | 3/1984  | Rudolph            | 244/215 |
| 4,448,375 | A | * | 5/1984  | Herndon            | 244/216 |
| 4,702,442 | A | * | 10/1987 | Weiland et al.     | 244/216 |
| 4,715,567 | A | * | 12/1987 | Poccard            | 244/213 |
| 4,717,097 | A | * | 1/1988  | Sepstrup           | 244/217 |

(Continued)

FOREIGN PATENT DOCUMENTS
EP          0922633        6/1999

OTHER PUBLICATIONS
International Search Report dated Jun. 12, 2007.

*Primary Examiner* — Christopher P Ellis
(74) *Attorney, Agent, or Firm* — Jenkins, Wilson, Taylor & Hunt, P.A.

(57) ABSTRACT

The invention relates to the monitoring of the landing flaps on an airfoil (2) for an aircraft (1), and to an aircraft (1) having such an airfoil (2). The airfoil (2) has a wingbox (3), a support (5) which is mounted relative to the wingbox (3) such that it can rotate with respect to a flap rotation axis (7), a flap (4) which is attached to the support (5) and rotates with respect to the flap rotation axis (7) during rotation of the support (5) relative to the wingbox (3), a movement mechanism (8) which is coupled to the support (5) in order to set an angle position of the flap (4) with respect to the wingbox (3) and a measurement apparatus (18) for detection of the angle position of the flap (4). The measurement apparatus (18) has a rotation sensor (19), which is arranged on the support (5), and a four-element coupling transmission (22, 24, 26, 27) which couples the rotation sensor (19) to the movement mechanism (8).

12 Claims, 6 Drawing Sheets

U.S. PATENT DOCUMENTS

| | | |
|---|---|---|
| 4,789,119 A | 12/1988 | Bellego et al. |
| 4,834,326 A * | 5/1989 | Stache .......................... 244/213 |
| 5,566,910 A * | 10/1996 | Diekmann et al. ............ 244/216 |
| 5,686,907 A | 11/1997 | Bedell et al. |
| 6,601,801 B1 * | 8/2003 | Prow et al. .................... 244/216 |
| 6,799,739 B1 | 10/2004 | Jones |
| 7,690,597 B2 * | 4/2010 | Cavalier et al. .............. 244/99.2 |
| 2005/0040294 A1 * | 2/2005 | Perez-Sanchez et al. ...... 244/215 |
| 2006/0226296 A1 * | 10/2006 | Perez-Sanchez ............. 244/215 |

* cited by examiner

# AIRFOIL FOR AN AIRCRAFT AND AIRCRAFT

TECHNICAL FIELD

The invention relates to an airfoil, or aeroplane wing, for an aircraft, and to an aircraft.

BACKGROUND

Airfoils for an aircraft generally comprise a wingbox and a plurality of flaps which are arranged on the wingbox, such as landing flaps. The flaps are extended during take-off and landing of the aircraft in order to increase the aerodynamic lift of the aircraft because, when extended, the flaps increase the effective curvature and area of the airfoil.

The flaps are preferably attached to two supports and are moved to their desired positions by means of a movement mechanism. By way of example, the supports can be mounted on in a respective holder, which is attached to the wingbox, such that they can rotate with respect to a flap rotation axis relative to the wingbox. During extension of the flap, the movement mechanism rotates the support and thus the flap with respect to this rotation axis. The aircraft has an appropriate measurement apparatus for determination of the position of the flap relative to the wingbox.

If a flap is attached to a plurality of supports, then all of the supports are in general moved synchronously with a respective movement mechanism. If, by way of example, one of the movement mechanisms is faulty or has failed entirely, then there is a risk of the flap being tilted or twisted during movement. This can lead to damage to the flap or to the wingbox, or to loss of the flap.

In contrast, the supports for the flaps for the aircraft disclosed in EP 0 922 633 B1 have a flap carriage which the movement mechanism moves on a flap path during retraction and extension of the flap. In order to determine the position of the flap relative to the wingbox, this application (aircraft) has a measurement apparatus with a rotation sensor, which converts the translational movement of the flap carriage to a rotary movement for the rotation sensor.

SUMMARY

One object of the invention is to design an airfoil and a flap which is mounted on the wingbox such that it can rotate with respect to a flap rotation axis, in such a manner that the position of the flap relative to the wingbox can be detected by relatively simple means.

A further object of the invention is to create preconditions for an aircraft such that any malfunction of the movement mechanism for a landing flap is reliably identified.

The object of the invention is achieved by an airfoil for an aircraft, having a wingbox, a support which is mounted relative to the wingbox such that it can rotate with respect to a flap rotation axis, a flap which is attached to the support and rotates with respect to the flap rotation axis during rotation of the support relative to the wingbox, a movement mechanism which is coupled to the support in order to set an angle position of the flap with respect to the wingbox and a measurement apparatus for detection of the angle position of the flap, with the measurement apparatus having a rotation sensor, which is arranged on the support, and a four-element coupling transmission which couples the rotation sensor to the movement mechanism.

The movement mechanism is coupled to the support and rotates it as required about the flap rotation axis. This likewise results in rotation of the flap which is attached to the support and, for example, is a landing flap. The movement mechanism thus makes it possible to move the flap to different positions relative to the wingbox. The positions are characterised by different angle positions of the flap relative to the wingbox, and the individual angle positions are detected by the rotation sensor, which is attached to the support, of the measurement apparatus. The measurement apparatus also has a four-element coupling transmission which couples the rotation sensor to the movement mechanism, that is to say the four-element coupling transmission is connected on the one hand to the rotation sensor and on the other hand to the movement mechanism. Since the rotation sensor is connected via the four-element coupling transmission to the movement mechanism, the movement mechanism also moves the rotation sensor during the movement of the support in such a way that its output signal is a measure of the angle position of the flap relative to the wingbox.

According to one embodiment of the airfoil according to the invention, the movement mechanism comprises a spindle, a spindle nut which is coupled to the support and a drive, with the drive rotating the spindle about its longitudinal axis in order to set the angle position of the flap, such that the spindle nut is moved along the longitudinal axis of the spindle and thus rotates the support about the flap rotation axis. The four-element coupling element is also coupled to the spindle nut. By way of example, the drive is a hydraulic or electrical drive. The spindle nut is also coupled to the four-element coupling transmission, by which means the movement of the spindle nut for rotation of the flap is input through the coupling transmission to the rotation sensor. The rotation sensor can thus emit an output signal which is associated with the angle position of the flap.

According to one preferred embodiment of the airfoil according to the invention, the four-element coupling transmission has a first lever arm and a second lever arm which is connected in an articulated manner to the first lever arm, with the first lever arm additionally being connected to the rotation sensor at a sensor rotation point, and with the second lever being connected in an articulated manner to the movement mechanism in particular to the universal joint of the spindle nut at a connection point. If required, the support is also attached to the universal joint of the spindle nut, in particular, such that it can rotate with respect to a rotation axis. In order to attach the support to the spindle nut such that it can rotate, the spindle nut has, in particular, a universally-jointed suspension.

The four-element coupling transmission according to one variant of the airfoil according to the invention preferably forms a quadrilateral whose sides are formed by the first and second lever arm as well as the connection paths between the sensor rotation point and the rotation axis, and the connection point and the rotation axis. The quadrilateral is preferably a parallelogram in order to achieve 1:1 transmission of the rotation of the flap to the rotation sensor.

According to a further embodiment of the airfoil according to the invention, the airfoil has a further support, to which the flap is likewise attached and which airfoil is mounted with respect to the flap rotation axis such that it can rotate relative to the wingbox, has a further movement mechanism which is coupled to the further support for adjustment of the angle position of the flap, and has a further measurement apparatus for detection of the angle position of the flap, with the further measurement apparatus having a further rotation sensor which is arranged on the further support, and having a further four-element coupling transmission which is coupled to the further rotation sensor with the further movement mechanism. The two movement mechanisms are, in particular, physically identical.

A further object of the invention is achieved by an aircraft having at least one airfoil according to the invention which, in particular, has an evaluation device, which is connected to the two rotation sensors, for evaluation of the signals which originate from the rotation sensors. If the airfoil according to the invention has a flap which is connected to two supports, then the two movement mechanisms are driven synchronously during movement of the flap. If one of the two movement mechanisms is defective, then this can lead to the flap being twisted or tilted during its movement. If a twisted or tilted flap is not identified in good time, and its movement is continued, then the flap can be damaged or even lost. The evaluation device for the aircraft according to the invention is designed in particular in such a manner that it evaluates the signals from the two rotation sensors and, on the basis of the evaluation, identifies an incorrect operating state of the flap and/or of at least one of the two movement mechanisms. An incorrect operating state of the flap is, inter alia, a twisted or tilted flap, a flap which has been moved asynchronously, or a damaged movement mechanism.

If the measurement apparatuses are physically identical and the two supports are moved synchronously, the output signals from the two rotation sensors are in general the same. If the two output signals differ significantly, then this could indicate a malfunction, such as a tilted flap or even a failure of one of the movement mechanisms.

In consequence, a differential signal formed from the two output signals when the movement is in synchronism is relatively small, so that a malfunction of the movement of the flap can be deduced if the difference signal exceeds a predetermined limit value.

If the two movement mechanisms are driven by two independent drives, then the comparison of the two output signals from the rotation sensors can also be used for synchronous open-loop or closed-loop control of the two drives.

The airfoil according to the invention and the aircraft according to the invention make it possible, inter alia, to reliably identify a failure of one of the movement mechanisms. In particular, it is possible to reliably identify a broken universal joint, to which the support for the flap is attached, and if necessary to inform the pilot of the aircraft of this.

BRIEF DESCRIPTION OF THE DRAWINGS

One exemplary embodiment of the invention is illustrated in an exemplary form in the attached schematic drawings in which.

DETAILED DESCRIPTION

Figure 1:
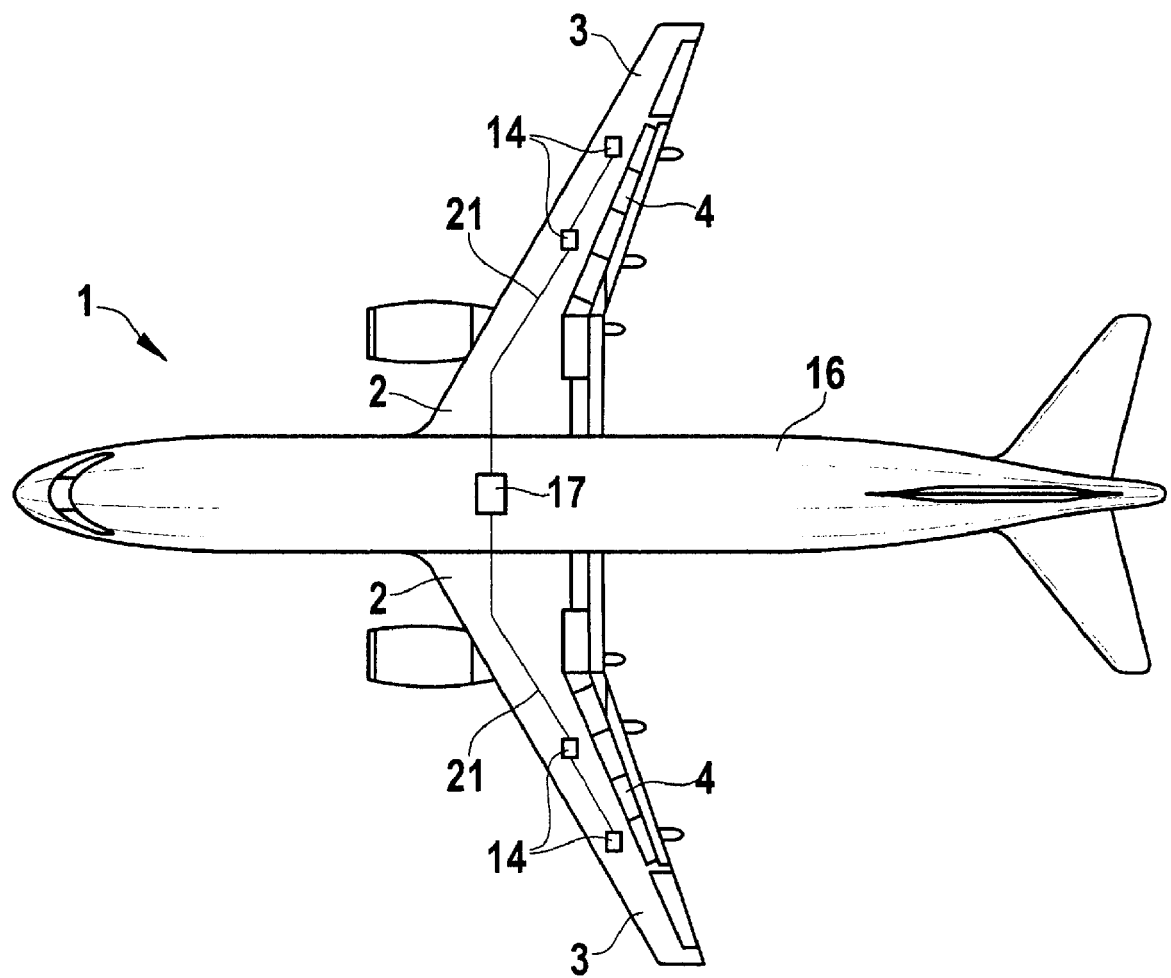
FIG. 1 shows an aircraft with an airfoil.
Figure 2:
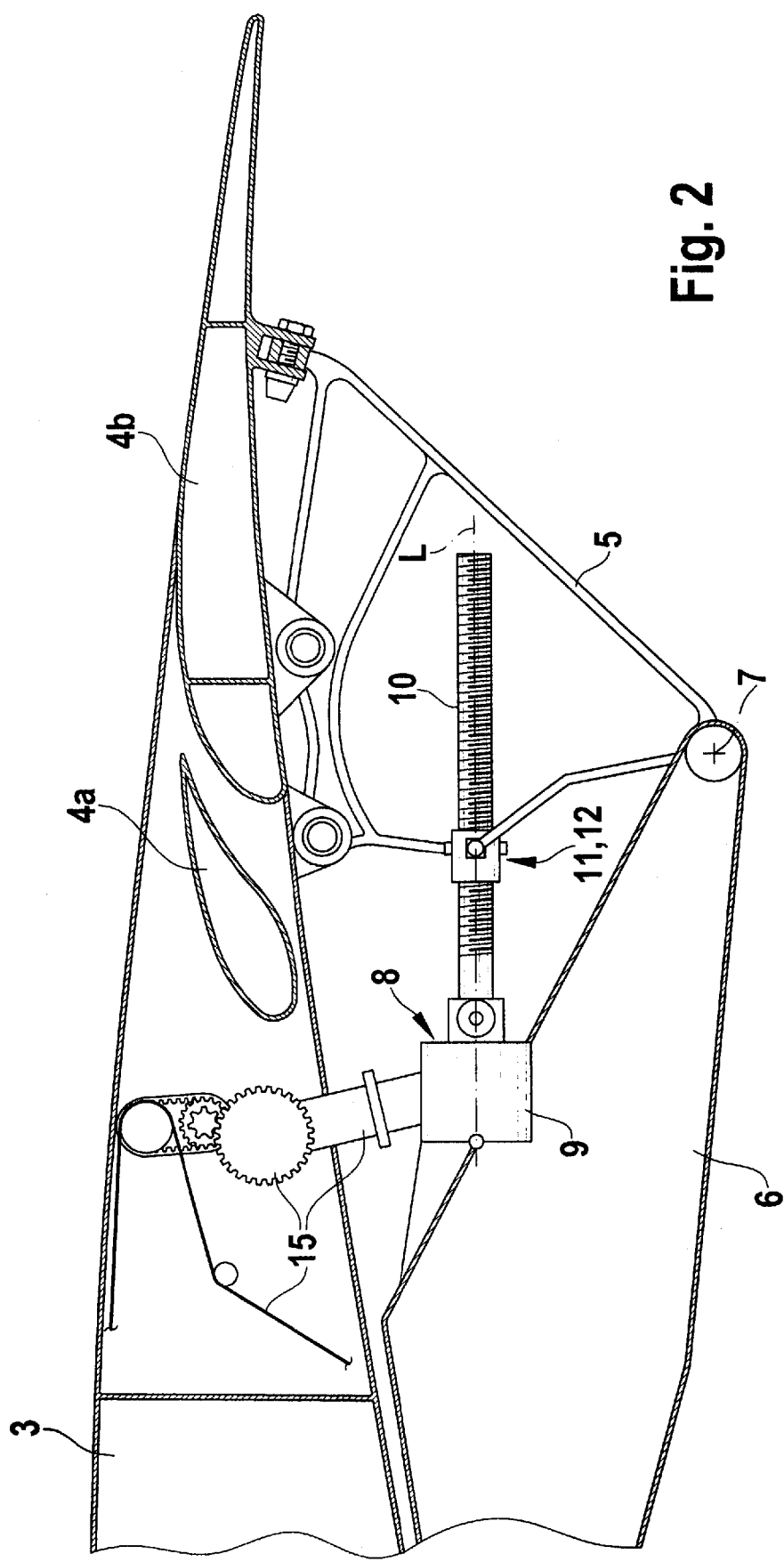
FIG. 2 shows a section through the airfoil of the aircraft shown in FIG. 1.
Figure 3:
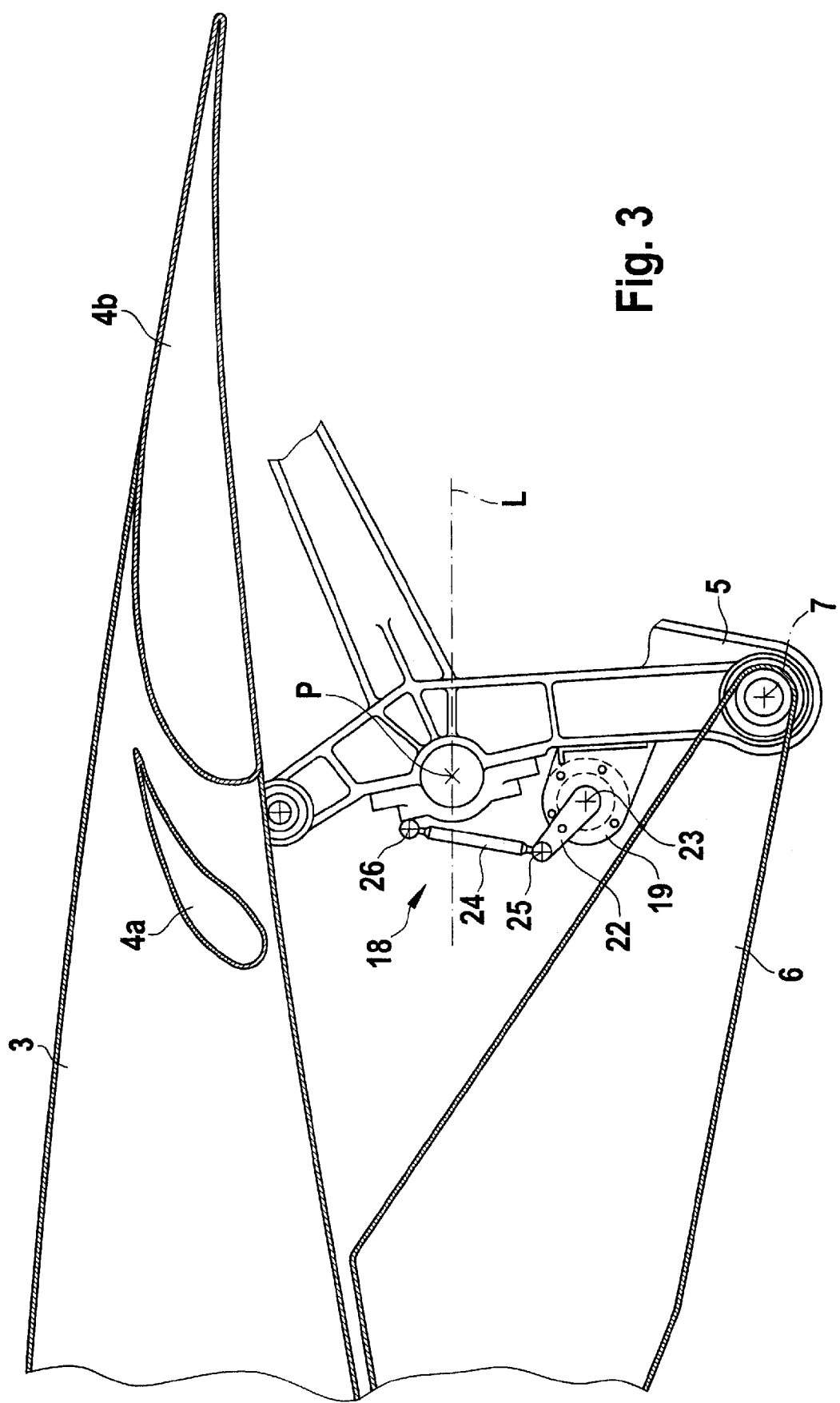
FIGS. 3 and 4 show different positions of a landing flap on the airfoil.
Figure 4:
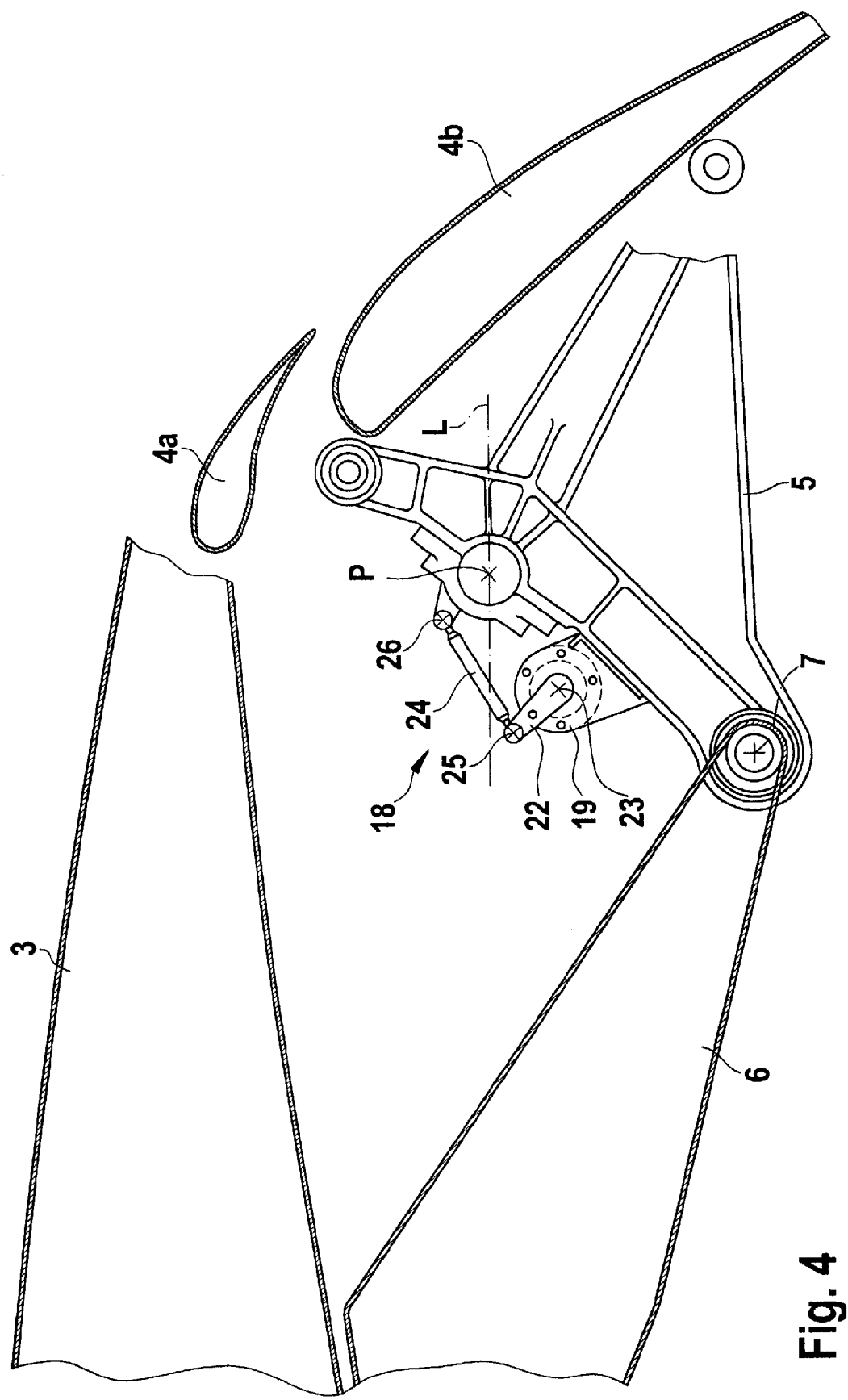

FIG. 1 shows an aircraft 1 with an airfoil 2. The airfoil 2 has a wingbox 3 and a plurality of landing flaps 4, which are illustrated in more detail in FIGS. 2 to 4. In the case of the present exemplary embodiment, each of the landing flaps 4, that is to say including the landing flap 4 that is illustrated in FIGS. 2 to 4, has a first landing flap element 4a and a second landing flap element 4b which are jointly attached to two essentially physically identical supports 5. Only one of the two supports 5 is illustrated in FIGS. 2 to 4.

Each of the two supports 5 is mounted on a holder 6, which is attached to the wingbox 3, such that it can rotate with respect to a flap rotation axis 7 which runs at right angles to the paper plane of FIGS. 2 to 4. The landing flap 4 is therefore also mounted via the two supports 5 such that it can rotate with respect to the flap rotation axis 7 relative to the wingbox 3.

The landing flaps 4 are intended to be operated in various positions relative to the wingbox 3 during operation of the aircraft 1. During normal flight, the landing flaps 4 are in the retracted position, as shown in FIGS. 2 and 3, relative to the wingbox 3. In order to increase the aerodynamic lift of the aircraft 1, in particular during take-off and landing, the landing flaps 4 can be extended to the position shown in FIG. 4 relative to the wingbox 3. During the movement between the retracted position shown in figure and the extended position shown in FIG. 4, the landing flaps 4 rotate about the flap rotation axis 7.

In order to move the landing flaps 4 between the retracted position and the extended position, the airfoil 2 has a plurality of movement mechanisms 8, which are each coupled to one of the supports 5 and rotate this about the flap rotation axis 7 during operation of the movement mechanism 8. One of the movement mechanisms 8 is illustrated in FIG. 2 with parts of it being illustrated in more detail in FIG. 5.

Figure 5:
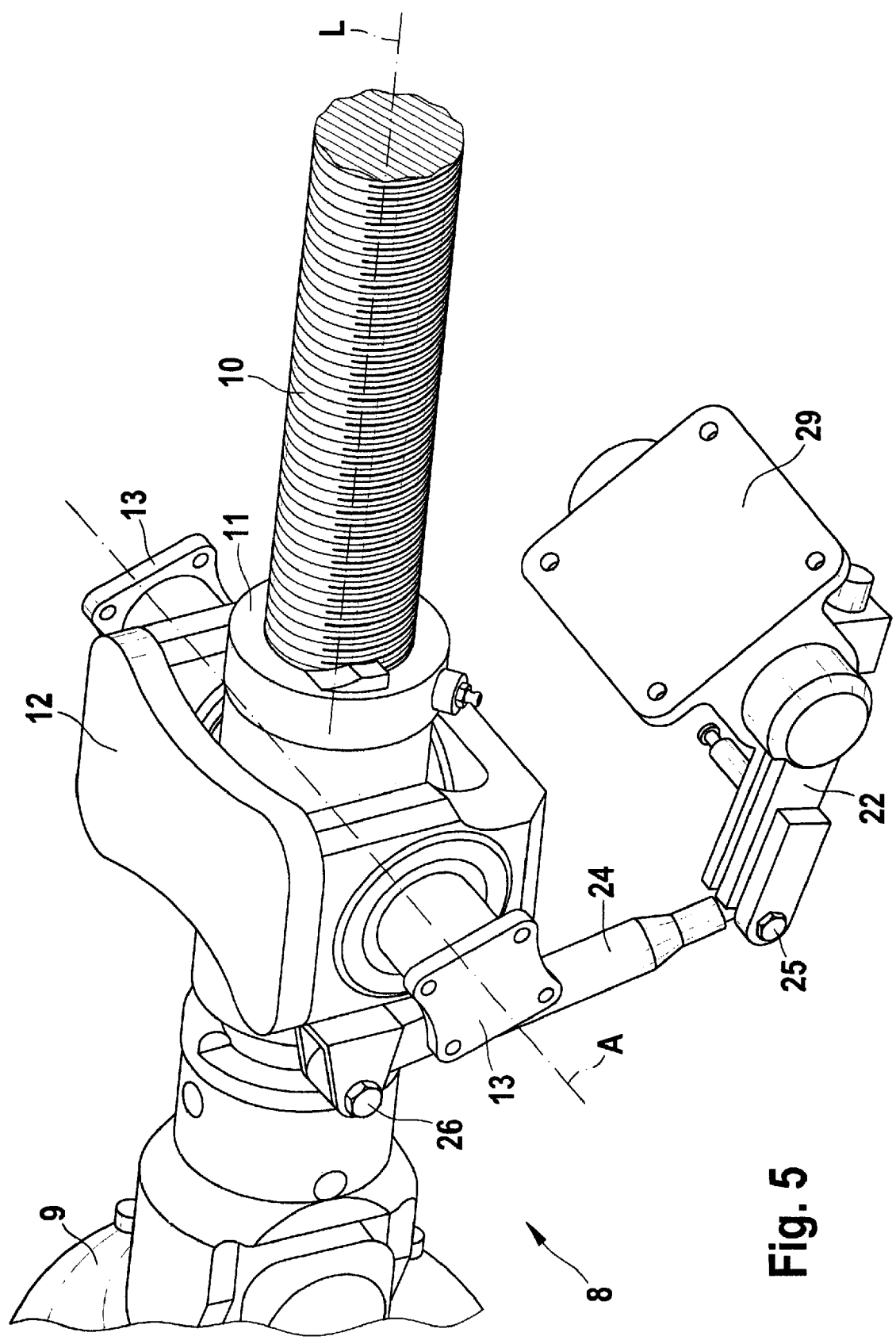
FIG. 5 shows an illustration of part of the movement mechanism for the landing flap on the airfoil and FIG. 6 shows a detailed view of a measurement apparatus for determining the position of the landing flap.

The movement mechanism 8 has a spindle head 9 which is attached to the corresponding holder 6, a spindle 10 which is suspended on a universal joint on the spindle head 9, has a spindle longitudinal axis L and is illustrated only partially in FIG. 5, and a spindle nut 11 with a universal joint 12. In the case of the present exemplary embodiment, the universal joint 12 is in the form of a universally-jointed ring on which the respective support 5 is mounted, on two respective holding apparatuses 13 of the universal joint 12, such that it can rotate with respect to an axis A.

In order to move the landing flaps 4, the spindles 10 of the movement mechanism 8 are rotated by means of a suitable drive along the spindle longitudinal axes L. In consequence, the spindle nut 11 is moved with its universal joint 12 along the spindle longitudinal axis L of the spindle 10, as a result of which the supports 5 and thus the landing flaps 4 rotate with respect to the flap rotation axis 7 relative to the wingbox 3. Depending on the position of the universal joint 12 relative to the spindle 10, the landing flap 4 and the support 5 assume a corresponding angle position relative to the wingbox 3.

The spindles 10 of the movement mechanisms 8 may, for example, be driven by a central hydraulic or electrical drive, which is not illustrated in any more detail in the figures, via shaft runs as is generally known for example from EP 0 922 633 B1, which was cited in the introduction. The individual spindles 10 of the movement mechanisms 8 are driven synchronously by the central drive.

However, in the case of the present exemplary embodiment, each of the individual movement mechanisms 8 has its own drive 14, which drives the corresponding spindles 10. The drives 14 are arranged in the wingbox 3, as illustrated schematically in FIG. 1 and, for example, are electrical or hydraulic drives. The respective drives 14 are coupled to the respective spindles 10 via a transmission unit 15, part of which is illustrated in FIG. 2, for the movement mechanisms 8.

As already described above, each of the landing flaps 4 is attached to in each case two essentially physically identical supports 5. Each of the supports 5 is driven by its own movement mechanism 8 with its own drive 14. In order to prevent tilting of the landing flaps 4, the two respective supports 5 are moved synchronously. For this purpose, the drives 14 are connected via electrical lines 21 to a computer 17 which is arranged in the fuselage 16 of the aircraft 1, and actuates the drives 14 in a suitable manner. The computer 17 is in turn connected in a manner that is not illustrated to the flightdeck of the aircraft 1, so that a pilot can move the landing flaps 4.

Figure 6:
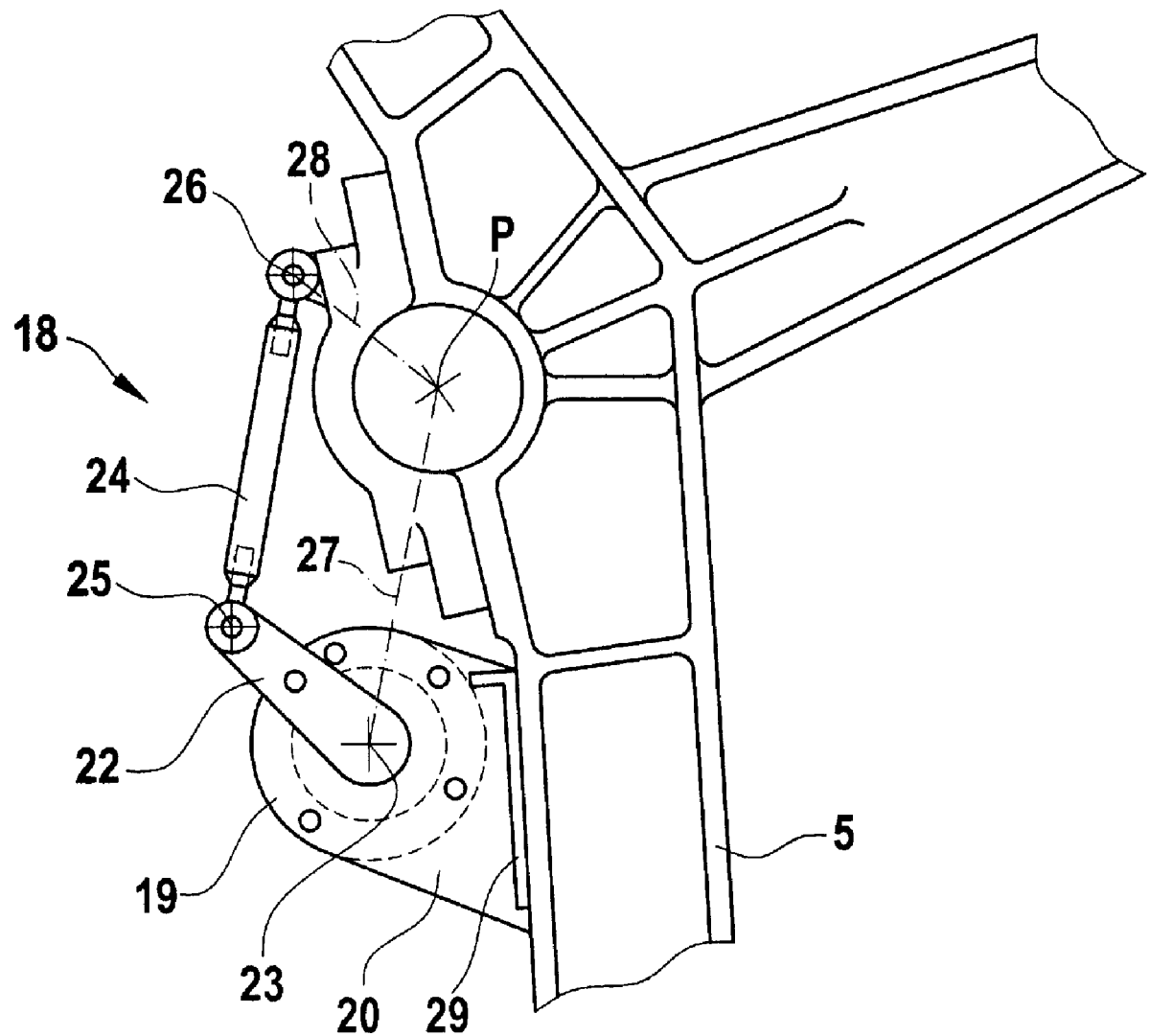

A measurement apparatus 18, which is illustrated in FIGS. 3, 4, and 6, is attached to each of the supports 5 in order to determine the angle position of the corresponding landing flap 4 or of the respective support 5 relative to the wingbox 3.

The measurement apparatus 18 has a generally known rotation sensor 19, which is accommodated in a sensor housing 20. The sensor housing 20 is screwed tightly to the support 5 via a sensor connecting foot 29, which is illustrated in more detail in FIG. 5. A shaft, which is concealed by a sensor lever arm 22 in the figures, is passed out of the sensor housing 20 and is tightly connected to one end of the sensor lever arm 22. The longitudinal axis of the shaft of the rotation sensor 19 is aligned at right angles to the plane of the drawing in FIG. 6. The connection point between the sensor lever arm 22 and the shaft of the rotation sensor 19 forms a sensor rotation point 23, so that the shaft of the rotation sensor 19 can be rotated relative to the sensor housing 20 by the sensor lever arm 22. The rotation sensor 19 emits an appropriate output signal on the basis of the position of the shaft of the rotation sensor 19 relative to the sensor housing 20, and this output signal is supplied to the computer 17 via an electrical line, which is not shown for the sake of clarity. A computer program in turn runs on the computer 17 and calculates the position of the corresponding support 5 relative to the wingbox 3 on the basis of the output signal that is produced by the rotation sensor 19.

The measurement apparatus 18 has a connection rod 24. One end of the connection rod 24 is connected in an articulated manner via a first connection point 25 to that end of the sensor lever arm 22 which is not connected to the rotation sensor 19. The other end of the connection rod 24 is connected in an articulated manner via a second connection point 26 to the universal joint 12.

The sensor lever arm 22 and the connection rod 24 essentially lie on the plane of the drawing in FIG. 6. The axis A with respect to which the support 5 is mounted, such that it can rotate on the universal joint 12, intersects the plane of the drawing at a point P. The connection path between the point P and the sensor rotation point 23 is annotated by the reference symbol 27. The connection path between point P and the second connection point 26 is annotated by the reference symbol 28.

The sensor lever arm 22, the connection rod 24 and the two connection paths 27, 28 form a quadrilateral, which represents a four-element coupling transmission, which couples the universal joint 12 to the rotation sensor 19, or to the shaft of the rotation sensor 19. In consequence, this four-element coupling transmission moves the rotation sensor 19 during rotation of the corresponding support 5 about the sensor rotation axis 7. This can be seen in FIGS. 3 and 4 since, when the landing flap 4 and the support 5 are in different positions relative to the wingbox 3, the sensor lever arm 22 in each case assumes two different positions with respect to the support 5, by means of the connection rod 24, as a result of which the sensor lever arm 22 moves the shaft of the rotation sensor 19 relative to the sensor housing 20.

Furthermore, in the present exemplary embodiment, the lengths of the sensor lever arm 22, of the connection rod 24 of the connection paths 27, 28 are designed in such a manner that these components form a parallelogram. This results in a 1:1 transmission ratio for the rotary movement of the support 5 with respect to the flap rotation axis 7 and the movement of the rotation sensor 19.

In the case of the present exemplary embodiment, a measurement apparatus 18 is attached to each support 5 for the airfoil 2 and measures the corresponding angle position of the support 5. The output signals associated with the angle positions from the rotation sensors 19 are supplied to the computer 17 by electrical lines which are not shown. As already described above, the landing flaps 4 are intended to be moved synchronously. In particular, the two supports 5 for one specific landing flap 4 are intended to be moved synchronously in order to prevent tilting or twisting of the landing flap 4.

In the present exemplary embodiment, a computer program runs on the computer 17, which evaluates the output signals from the rotation sensors 19 and controls the drives 14 on the basis of the evaluation in such a manner that the two supports 5 of one landing flap 4 are moved synchronously. In particular, the computer 17 forms a differential signal from two output signals from two rotation sensors 19 which are associated with one landing flap 4. As long as the corresponding supports 5 are moving synchronously, the magnitude of this differential signal is relatively small. If the magnitude of the differential signal in contrast exceeds an upper limit value, then it can be deduced that the two supports 5 are moving asynchronously, and it can also be deduced, for example, that one universal joint 12 is broken. In the case of the present exemplary embodiment, the computer 17 interrupts the further movement of the supports 5 when the magnitude of the differential signal exceeds the limit value, and passes an appropriate warning message to the flightdeck of the aircraft 1.

LIST OF REFERENCE SYMBOLS

1 Aircraft
2 Airfoil
3 Wingbox
4 Landing flap
4a, 4b Landing flap element
5 Support
6 Holder
7 Flap rotation axis
8 Movement mechanism
9 Spindle head
10 Spindle
11 Spindle nut
12 Universal joint (universally-jointed ring)
13 Holding apparatuses
14 Drive
15 Transmission unit
16 Aircraft fuselage
17 Computer
18 Measurement apparatus
19 Rotation sensor
20 Sensor Housing
21 Electrical lines
22 Sensor lever arm
23 Sensor rotation point
24 Connection rod
25 Connection point
26 Connection point
27, 28 Connection path
29 Sensor connecting foot A Axis
L Spindle longitudinal axis
P Point

The invention claimed is:

1. Airfoil for an aircraft, comprising
a wingbox,
a support which is mounted relative to the wingbox such that it can rotate with respect to a flap rotation axis,
a flap which is attached to the support and rotates with respect to the flap rotation axis during rotation of the support relative to the wingbox,
a movement mechanism, which is coupled to the support, for setting an angle position of the flap with respect to the wingbox and
a measurement apparatus for detection of the angle position of the flap, the measurement apparatus having a rotation sensor, which is arranged on the support, and a four-element coupling transmission which couples the rotation sensor to the movement mechanism.

2. Airfoil according to claim 1, in which the movement mechanism comprises a spindle, a spindle nut, which is coupled to the support, and a drive, and the four-element coupling element is coupled to the spindle nut, the drive rotating the spindle about its longitudinal axis in order to set the angle position of the flap, such that the spindle nut is moved along the longitudinal axis of the spindle and thus rotates the support about the flap rotation axis.

3. Airfoil according to claim 1, in which the four-element coupling transmission comprises a first lever arm and a second lever arm which is connected in an articulated manner to the first lever arm, the first lever arm additionally being connected to the rotation sensor at a sensor rotation point, and with the second lever arm being connected in an articulated manner to the movement mechanism at a connection point.

4. Airfoil according to claim 3, in which the second lever arm is connected in an articulated manner to the spindle nut at the connection point.

5. Airfoil according to claim 4, in which the spindle nut comprises a universal joint, by means of which the second lever arm is connected in an articulated manner at the connection point and to which the support is attached such that it can rotate with respect to a rotation axis.

6. Airfoil according to claim 5, in which the four-element coupling transmission forms a quadrilateral whose sides are formed by the first and second lever arm as well as the connection paths between the sensor rotation point and the rotation axis, and the connection point and the rotation axis.

7. Airfoil according to claim 6, in which the quadrilateral is a parallelogram.

8. Airfoil according to claim 1, in which the flap is a landing flap.

9. Airfoil according to claim 1, comprising a further support, to which the flap is attached and which is mounted with respect to the flap rotation axis such that it can rotate relative to the wingbox, a further movement mechanism which is coupled to the further support for adjustment of the angle position of the flap, and a further measurement apparatus for detection of the angle position of the flap, the further measurement apparatus having a further rotation sensor which is arranged on the further support, and having a further four-element coupling transmission which is coupled to the further movement mechanism.

10. Aircraft having at least one airfoil according to claim 1.

11. Aircraft having at least one airfoil according to claim 9 and having an evaluation device, which is connected to the two rotation sensors, for evaluation of signals which originate from the rotation sensors.

12. Aircraft according to claim 11, in which the evaluation device forms a differential signal from the two signals from the rotation sensors, and if a limit value is overshot or undershot, deduces an incorrect operating state of the flap, and/or of at least one of the two movement mechanisms.

* * * * *